(12) United States Patent
Keren

(10) Patent No.: US 6,270,220 B1
(45) Date of Patent: Aug. 7, 2001

(54) MULTIFOCAL LENS

(75) Inventor: Eliezer Keren, Arad (IL)

(73) Assignee: Rotlex (1994) Ltd., Arava (IL)

( * ) Notice: Subject to any disclaimer, the term of this patent is extended or adjusted under 35 U.S.C. 154(b) by 0 days.

(21) Appl. No.: 09/334,067

(22) Filed: Jun. 16, 1999

(30) Foreign Application Priority Data

Jun. 18, 1998 (IL) ......................................................... 124991

(51) Int. Cl.$^7$ ............................... G02C 7/06; G02C 7/04
(52) U.S. Cl. ............................................ 351/169; 351/161
(58) Field of Search .................................... 351/168, 169, 351/170, 171, 172, 161

(56) References Cited

U.S. PATENT DOCUMENTS

| | | | |
|---|---|---|---|
| 4,338,005 | * | 7/1982 | Cohen ................................. 351/168 |
| 4,427,272 | * | 1/1984 | Gernet ................................. 351/169 |
| 4,637,697 | | 1/1987 | Freeman . |
| 4,950,057 | * | 8/1990 | Shirayanagi ......................... 351/169 |
| 5,760,871 | | 6/1998 | Kosoburd et al. . |

FOREIGN PATENT DOCUMENTS

| | | |
|---|---|---|
| 0 316 162 | 7/1989 | (EP) . |
| 0 605 841 | 7/1994 | (EP) . |
| 0 756 189 | 1/1997 | (EP) . |

* cited by examiner

Primary Examiner—Scott J. Sugarman
(74) Attorney, Agent, or Firm—Browdy & Neimark

(57) ABSTRACT

A multifocal lens having far and near vision zones is presented. The lens comprises a substrate in the form of a progressive addition lens and a modulation formed on a surface of the substrate. The substrate lens has far and near vision zones, selected in accordance with respective prescribed values of optical power required for the patient's eye at his distance and reading vision, and an intermediate transition region between the far and near vision zones. The modulation is of kind producing locally variable power addition such that the far and near vision zones of the multifocal lens are wider than the far and near vision zones of the substrate.

11 Claims, 5 Drawing Sheets

(GENERAL ART)

(GENERAL ART)

(GENERAL ART)

(GENERAL ART)

MULTIFOCAL LENS

FIELD OF THE INVENTION

The present invention relates generally to multifocal lenses, and in particular to multifocal lenses combining the properties of progressive addition lenses (PAL) and diffractive lenses.

BACKGROUND OF THE INVENTION

Multifocal lenses are known and widely used, being prescribed for those requiring different dioptric powers for distance and reading vision. This condition is called "presbyopia". It mostly appears when one gets older and age renders it difficult for the eye (if not impossible) to focus on near and distant objects. This condition may be relieved by prescribing one pair of lenses for distance vision and another for reading vision. A single pair of either bifocal or multifocal lenses can replace both of these pairs of lenses.

The most common multifocal lens is the so-called "progressive addition lens" or PAL. This lens has a far vision zone located at the top of the lens, and a near vision zone located at the bottom of the lens, the far and near vision zones being connected by an intermediate transition region. In this intermediate transition region, called "corridor", focus changes continuously from the focus at the far vision zone to that of the near vision zone. The locations of the far and near vision zones are dictated by the prescribed parameters of the optical powers required for an individual's "distance" and "reading" visions which define the lens' addition. Thus, a PAL is characterized by the gradual change of its optical power from the top of the lens to the bottom.

It is obvious that both the upper, far vision zone and the lower, near vision zone of the PAL should be as wide as possible, to enable the wearer to read comfortably, without having to move his head sideways to follow the text. However, large far and near vision zones result in a shorter intermediate transition region in between them, i.e. corridor, making this region less usable.

PALs are generally of two designs, so-called "hard" and "soft" designs, depending on the distance between the far and near vision zones, i.e., the length of the corridor, which ranges typically between 16 and 24 mm. The "hard" design is characterized by a relatively sharp transition region, as compared to that of the "soft" design. Such a sharp transition region induces large distortions on either side of the corridor. The "soft" design sacrifices the widths of far and near vision zones in favor of a more gradual transition with less distortion. The main principles of PALs of "hard" and "soft" designs are illustrated in FIGS. 1 and 2, respectively.

FIG. 1 shows an image $I_1$ of a pattern of equidistant, vertical lines L, which is obtained through a PAL with "hard" power variations. It is evident, that the optical power at a bottom region $R_B$ of the lens, i.e. in the near vision zone which produces a relatively larger magnification for the reading vision, is larger than the power at a top region $R_T$ which is used for distance vision. Additionally, the line separation $\Delta L_B$ in the bottom region $R_B$ is wider than the line separation $\Delta L_T$ in the top region $R_T$. With a progressive continuous power profile, top portions $L_T$ of the imaged lines L join smoothly with bottom portions $L_B$, so that they must bend in the intermediate region, or corridor, of the lens. However, the line bending effect produces image distortion, for example, similar to that one would observe through a cylindrical lens with an axis at 45°. As shown, the distortion is minimal along the central vertical line $L_0$, and increases towards periphery regions at both sides of the central vertical line $L_0$. The width of the intermediate region between the far and near vision zones of the lens is determined by an area in the lens where distortion remains below a predefined threshold, normally 0.5 diopter cylinder. Thus, in the PAL of the "hard" design, the corridor is both short and narrow.

FIG. 2 illustrates an image $I_2$ of a pattern of equidistant, vertical lines L, which is obtained through a PAL of a "soft" design with much more gradual progression. It is seen that the line bending is less pronounced here, as compared to that of the hard PAL shown in FIG. 1. Moreover, the distortion is lower, and a corridor is longer and wider. The height of a near vision zone, through which a lower region $R_B$ of the image $I_2$ is obtained, and which is defined by the region where line-portions $L_B$ are straight and equidistant, is nevertheless much shorter. The same may be said about a far vision zone through which the upper region $R_T$ of the image $I_2$ is obtained.

Multifocal contact lenses follow markedly different design considerations. Known contact lenses with more than a single power are, generally, of three types: simultaneous vision bifocal lenses, simultaneous vision multifocal lenses and diffractive lenses based on the Fresnel zone plate concept. A simultaneous vision bifocal lens is constructed from two or more concentric rings with alternating powers corresponding to distance and reading visions. The wearer of such a bifocal lens observes a scene through both powers simultaneously, relying on a curious psychological effect to overcome the inevitable blurring of the observed scene. When observing a distant scene, the eye focuses in accordance with the distance vision power, while the near vision induces a foggy or hazy background, which, for many individuals, is not objectionable. A simultaneous multifocal contact lens has a progressive radial change in power.

Diffractive lenses, in general, employ a different effect, as compared to the refractive lenses. Diffraction is a phenomenon that occurs when an electromagnetic wave, such as light, encounters an obstacle and propagates non-linearly. This ability to "bend" a part of a light beam is the basic property used to realize any diffractive lens. Diffractive lenses are lightweight substitutes for the conventional refractive lenses used in monochromatic applications.

As for the diffractive contact lens based on the Fresnel zone plate, it can perform just like a refractive lens. As schematically illustrated in FIG. 3, the Fresnel zone plate comprises a circular concentric phase grating PG with a pitch varying quadratically with the distance from the center $C_0$.

FIG. 4 illustrates a profile 10 of a phase grating utilizing the Fresnel zone plate. For example, the profile 10 is designed such that a single diffraction order, for example "−1", survives. It is understood that with the grating pitch becoming smaller with the radial distance, the diffraction angle, or beam bending effect, grows proportionally, and an incident collimated light beam becomes focused on a point, which is the typical behavior of a lens. This is the physical principle on which the diffractive contact lens relies to achieve its aim.

A multifocal lens can be produced from the diffractive lens by forming a radial grating having several orders, usually two or three, on a substrate shaped like a normal spherical or toric lens. Such a tri-focal diffractive lens is disclosed, for example, in U.S. Pat. No. 5,760,871.

FIG. 5 illustrates the main operational principles of a multifocal diffractive lens 12 comprising a radial grating 14 formed on a spherical substrate 16. The lens 12 focuses images from infinity 18A, from a middle distance 18B and from a reading distance 18C onto an imaging surface, i.e., a retinal surface 20 of the eye. The zero order has the power of the lens substrate 16, which would be observed in the absence of the grating 14. Positive (+1) and negative (−1) diffraction orders produce high and low powers of the lens 12, respectively. The power difference between the positive and the negative orders is referred to as the power addition of the lens.

The advantages of a diffractive lens are associated with the following. The selection of correct design parameters of the diffractive lens allows for minimizing its chromatic aberrations, which are present in any refractive lens. Indeed, the angle of refraction and diffraction angle change with the light wavelength in opposite directions, and the combination of these two parameters produces a near achromatic lens. Other advantages of the diffractive lens are the absence of distortion and the availability of the entire lens area for far, intermediate and near vision.

However, the diffraction lens suffers from drawbacks associated with the fact that only a small percentage of light (about 30–40%) is available for each focusing range, and with the unavoidable image blurring. A technique disclosed in the above patent is aimed at increasing the percentage of incident light generated through each diffraction order. To this end, the diffraction grating has a specific pattern (e.g., trapezoidal protrusions and trapezoidal recesses) with the phase difference between light passing through protrusions and recesses (optical height) substantially less than the half of an average optical wavelength viewed with the lens.

SUMMARY OF THE INVENTION

There is accordingly a need in the art to improve multifocal lenses by providing a novel multifocal lens that combines the advantages of PAL with those of diffractive lenses.

The major feature of the present invention is to provide such a lens that is characterized by large focusing areas for far and near vision, whereby, for example, the wearer may read without having to move his head from side to side along the lines of a given text.

A further feature of the present invention is to provide such a lens that has a smooth transition between the far and near vision focusing areas, so that the wearer may take advantage of the intermediate focusing region.

There is thus provided according to the present invention a multifocal lens having far and near vision zones, the multifocal lens comprising:

(a) a substrate in the form of a progressive addition lens having far and near vision zones, selected in accordance with respective prescribed values of optical power required for the patient's eye at distance and reading vision, and an intermediate transition region between the far and near vision zones; and (b) a modulation formed on a surface of said substrate and producing locally variable power addition such that said far and near vision zones of the multifocal lens are wider than said far and near vision zones of the substrate.

Preferably, the modulation is formed on the convex surface of the PAL substrate which, preferably, is of a soft design.

The modulation is of a kind producing diffraction orders, for example, a phase grating. The modulation produces an optical power addition to the optical power of the substrate. This optical power addition is maximal within the intermediate transition region and decreases gradually towards the far and near vision zones of the substrate.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
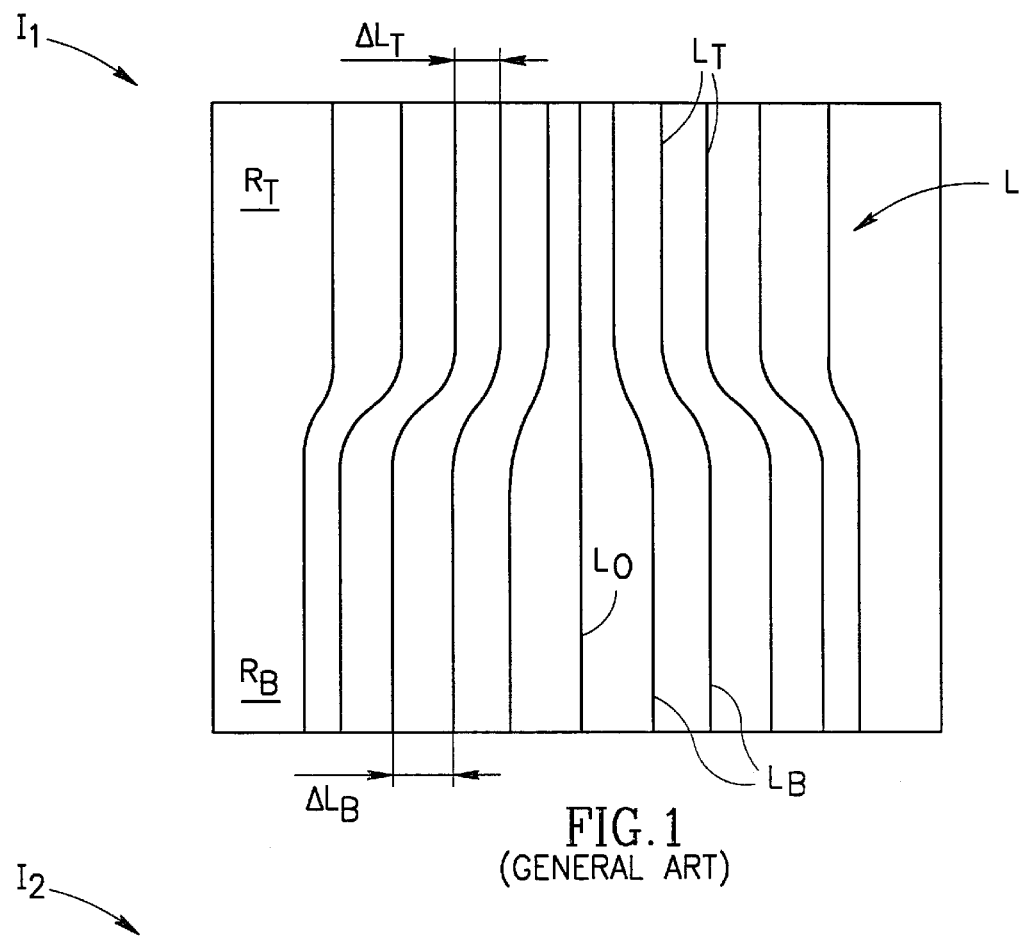
FIG. 1 schematically illustrates an image of a pattern of equidistant, vertical lines, observed through a PAL with "hard" power variation.
Figure 2:
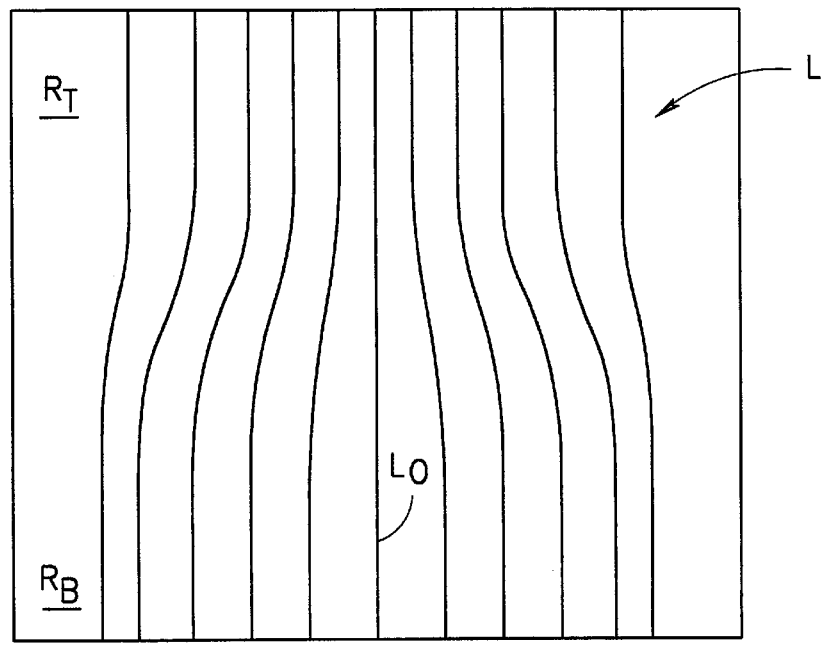
FIG. 2 schematically illustrates an image of a pattern of equidistant, vertical lines observed though a PAL with "soft" power variation.
Figure 3:
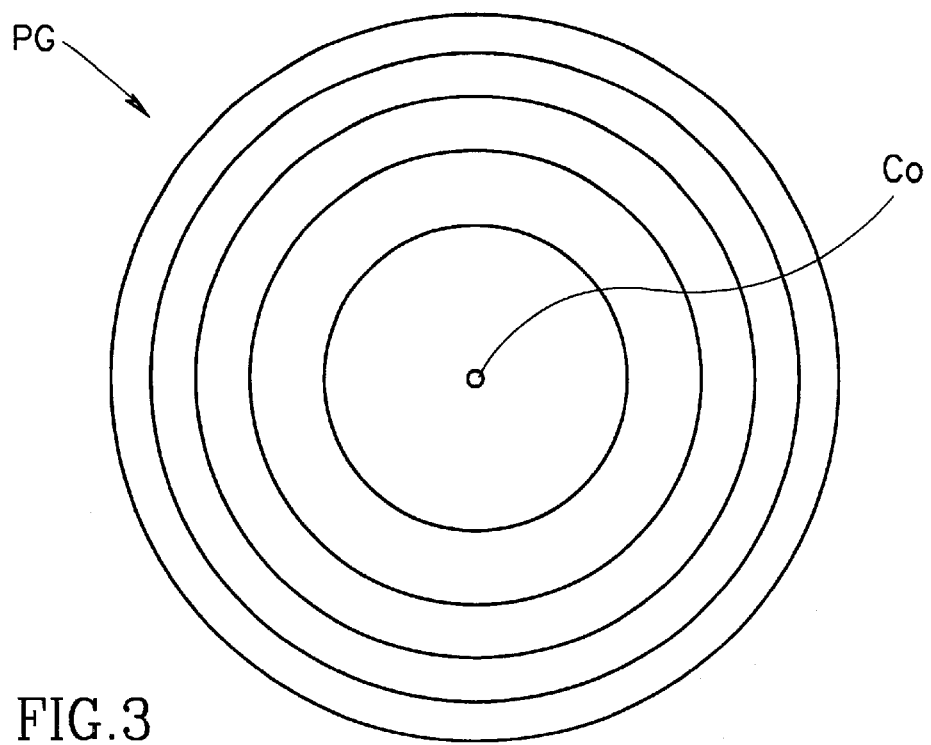
FIG. 3 schematically illustrates the conventional Fresnel zone plate.
Figure 4:
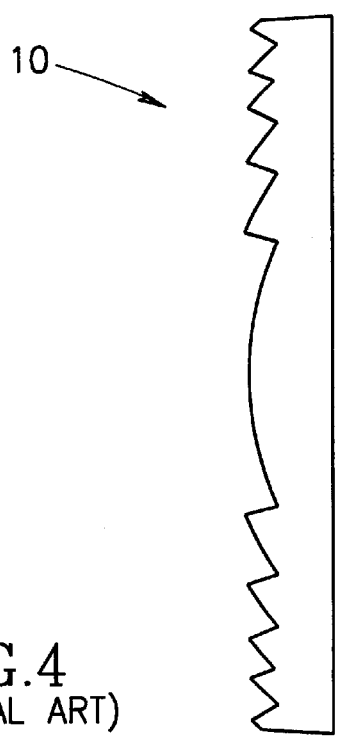
FIG. 4 schematically illustrates a profile of the conventional diffractive phase grating utilizing the Fresnel zone plate of FIG. 3.
Figure 5:
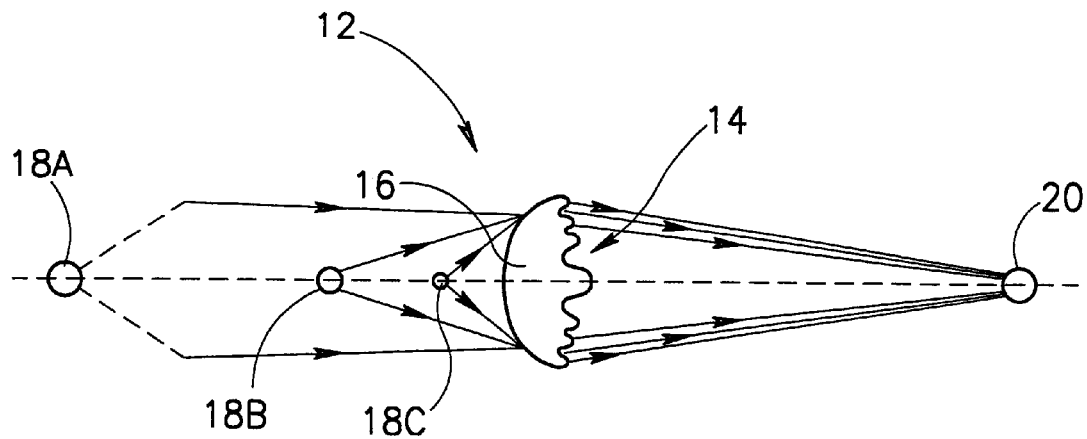
FIG. 5 is a schematic illustration of the main principles of a conventional tri-focal diffractive lens.

FIGS. 1 and 2 schematically illustrate the main principles of PALs with "hard" and "soft" power variations, respectively. FIGS. 3 and 4 illustrate, respectively, the Fresnel zone plate and a diffraction grating utilizing the same. FIG. 5 illustrates the tri-focal diffractive lens.

Figure 6:
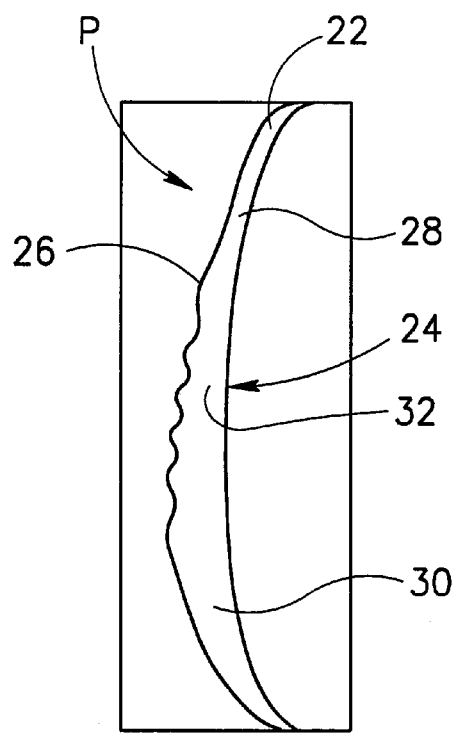
FIG. 6 schematically illustrates a multifocal lens constructed according to the present invention.

Referring to FIG. 6, there is illustrated a profile P of a multifocal lens 22 constructed according to the present invention. The lens 22 comprises a substrate 24 and a diffraction grating 26 (constituting a modulation) formed on a convex surface 24A of the substrate 24. The substrate 24 is designed like a soft PAL having a prescribed power addition, while the diffraction grating 26 has locally variable power addition, as will be described more specifically further below.

In the present example, the diffraction grating 26 is a phase grating producing three diffraction orders, for example, "−1", "0" and "+1". A grating period distribution of the diffraction grating 26 is carefully designed such that the power of the grating 26 vanishes at a top part 28 and a lower part 30 of the PAL substrate 24. An intermediate transition region 32, or corridor, is located between the top and the lower parts 28 and 30 of the PAL substrate 24.

The lens 22 is manufactured by the known technology of holographic optical elements (HOE). Diffractive lenses in the form of holographic optical elements (HOE) have been developed. The diffraction pattern of such a lens is designed to produce a specific optical effect. HOE elements are normally designed by computer, and are produced by etching, electron beam machining and other advanced technologies.

It should be noted that the PAL substrate 24 could be of a "hard" design. Additionally, although not specifically shown, the modulation 26 could be formed on a concave surface of the substrate 24.

Figure 7:
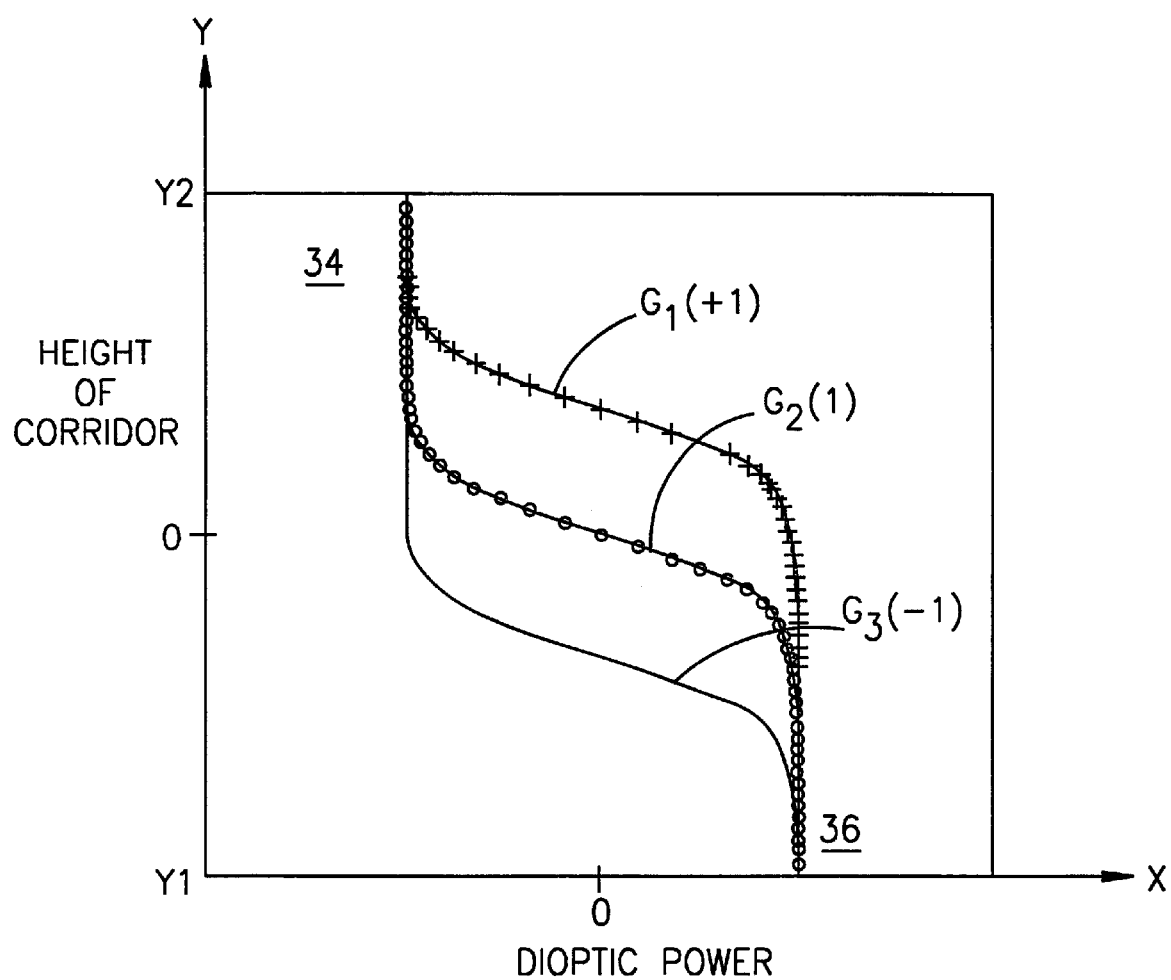
FIG. 7 schematically illustrates the power distribution of three orders in an intermediate region of the multifocal lens of FIG. 6.

The main operational principles of the lens 22 will now be described with reference to FIG. 7. Three graphs, $G_1$, $G_2$ and $G_3$, illustrate the power distribution of the lens 22 while focusing, respectively, three diffraction orders "+1", "0" and "−1"(positive, zero and negative orders) along the lens between the far and near vision zones 28 and 30. Each graph presents the dependence of the dioptric power of the lens 22 (X-axis) in the intermediate region 32 with the position along the height of this region (Y-axis). It should be understood that the illustration in FIG. 7 is qualitative and is therefore not drawn to any specific scale. For example, the full scale along the Y-axis may be 40 mm.

The range of the positions along the height of the corridor 32 starts from the origin $Y_1$ which borders with the lower part 30, and continues up to the edges of the top part 28, i.e., the coordinate $Y_2$. Graphs $G_1$, $G_2$ and $G_3$ look like S-shaped hysteresis curves rotated by 90° to vertical position, with all three curves converging together and joining in a left upper part 34 and right lower part 36 of FIG. 7.

The zero order (graph $G_2$) does not deflect light beyond the normal refraction of the lens material, but rather behaves like the original "soft" design PAL substrate 24. As indicated above, the power of the grating vanishes at the top part 28 of the PAL substrate 24 such that the diffractive power of the grating 26 there is equal to zero, and, as seen in FIG. 7, the three orders are identical. Hence, when the wearer of the multifocal lens 22 looks through the far vision zone 28, where there is zero power addition produced by the grating, he enjoys the advantage of all the light available.

Now moving downward from the top part 28 of the PAL substrate 24 into the corridor 32, by moving from the left upper part 34 to the right lower part 36 of FIG. 7, it is seen that the three orders begin to separate. This is due to the changes in the diffraction power of the grating. At the left upper part 34, where the zero order (central curve $G_2$) starts to bend, the "−1" order (curve $G_3$) is still constant.

Figure 8:
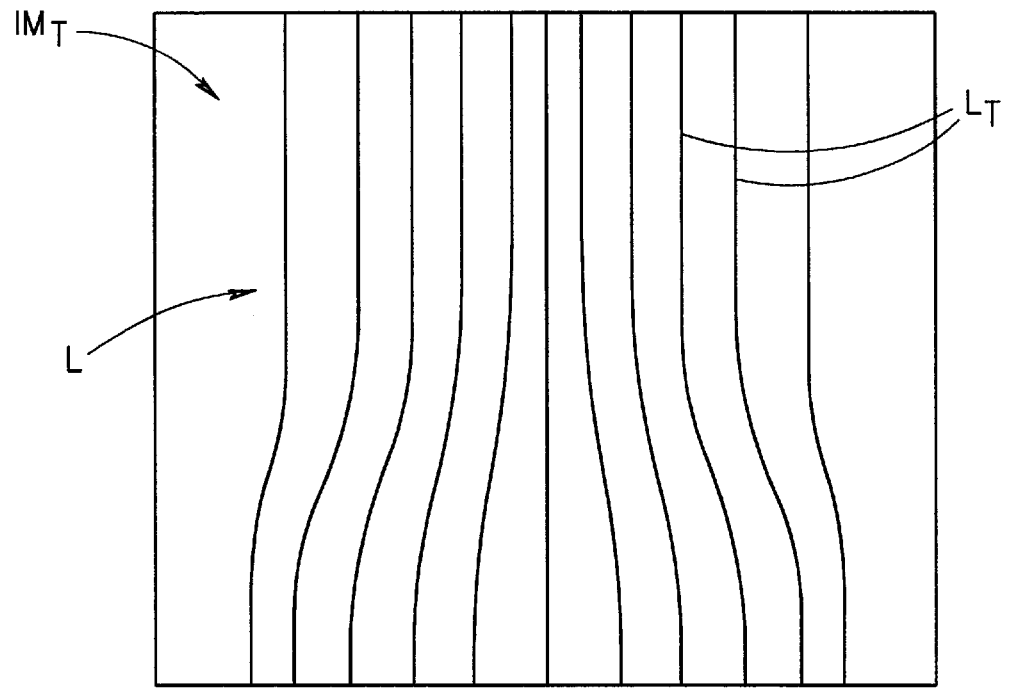
FIGS. 8 and 9 illustrate images of a pattern of equidistant, vertical lines as observed through the far vision area and near vision area, respectively, of the multifocal lens of FIG. 6.

The effect on the far vision zone 28 is shown in FIG. 8, which illustrates an image $IM_T$ of upper portions $L_T$ of equidistant vertical lines L observed through the far vision zone 28 of the lens 22. As shown, focusing on the "−1" order, has the effect of increasing the far vision zone 28 with a major part of the transition region 32, and without sacrificing the transition region.

Turning back to FIG. 7, around the middle of the corridor 32, i.e., between the left upper part 34 and right lower part 36, the orders' separation and the power addition, produced by the diffraction grating, are the largest. The three orders are available for focusing intermediate, as well as near and far objects.

Since the power of the grating vanishes at the bottom part 30 of the PAL substrate 24, as shown in FIG. 7, the three orders are identical, thereby causing the multifocal lens 22 to behave like the original "soft" design PAL substrate 24. Subsequently, when descending along the "+1" order (curve $G_1$) towards the lower part 30 of the PAL substrate 24, which is intended for near vision, the diffraction grating 26 increases the near vision zone 30 by adding a major part of the corridor 32 to the near vision zone 30.

Figure 9:
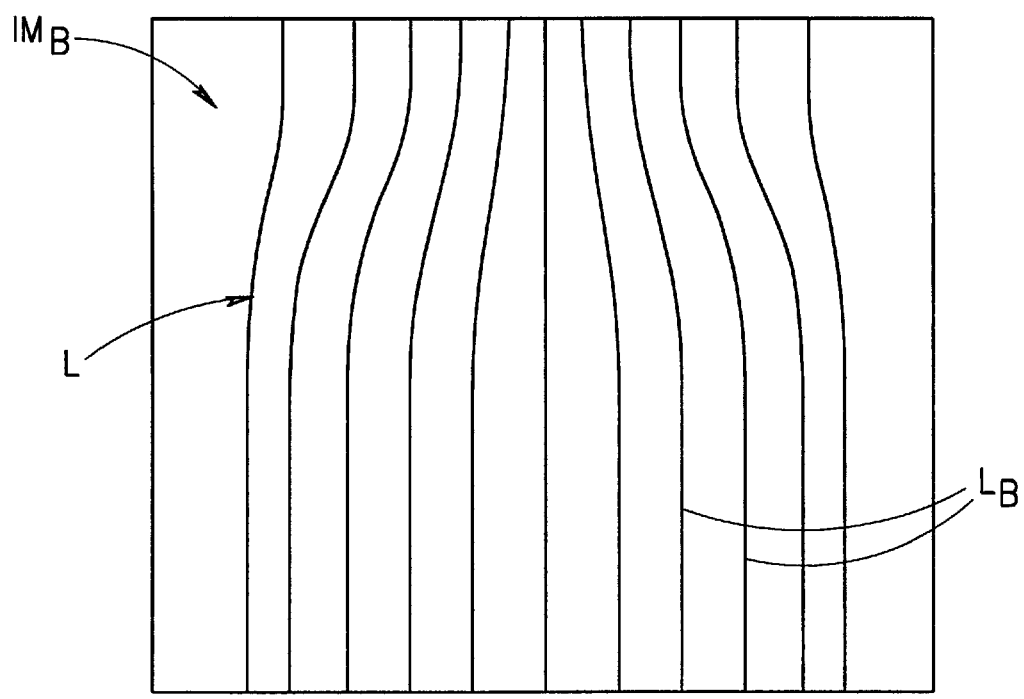

The above effect is better seen in FIG. 9 illustrating an image $IM_B$ of lower portions $L_B$ of equidistant vertical lines L observed through the near vision zone 30 of the lens 22. The separation of the three orders decreases gradually to zero at the bottom part 30, which is the reading zone, where all three orders are again the same.

Turning back to FIG. 6, the profile of the corridor 32 of the lens 22 is shown. The larger curvature of the lens 22 within the bottom part 30 signifies a higher optical power in this region.

The modulation of the surface of the lens 22 producing a phase grating is more pronounced in the transition region 32, where it brings about a separation between the three orders "−1", "0" and "+1", as shown in FIG. 7. It should be noted that the diffraction effect diminishes towards the edges 28 and 30, where the multifocal lens 22 behaves like an ordinary PAL.

The combination of a PAL with a diffraction grating may be regarded as a carrier with a modulation. The carrier is the refractive substrate 24, while the modulation is implemented as the diffraction grating 26.

It should be noted that the distribution of refractive power in the substrate 24 could be achieved not only by a suitable surface profile but also by other means. For example, the surface may be spherical, as shown in FIG. 5, with the refractive power distribution achieved using gradient index materials. Such a lens with refractive index profile increasing from the top to bottom will produce a power increase in the same direction. The optical power variation of the diffraction grating 26 is smaller than the power addition of the prescribed PAL 24. It should also be noted that, when designing the combination, efficiency, ergonomics and even aesthetic aspects should be considered to define various parameters of the diffraction grating, such as pitch, shape, relative location on the PAL substrate, etc.

The advantages of the present invention are self-evident. Indeed, all three diffraction orders exhibit soft low distortion profiles. The lens is characterized by relatively wide far and near vision zones, as compared to those of a conventional PAL. All the light energy is available over the sizable portion of both the far and near vision zones. Diffraction haze (image blurring) occurs only along the transition zone (corridor), and is less prominent, as compared to pure diffraction lenses. This is due to the fact that the power differential between the different diffraction orders is smaller. The diffraction grating parameters on either side of the corridor can vary towards the reduction of the distortion that remains there even with a "soft" profile. The change of the power of the diffraction grating with the light wavelength compensates for the change induced by the refractive power of the PAL substrate, thereby reducing the chromatic aberration of the entire combination.

Those skilled in the art will appreciate that various modifications and changes may be applied to the preferred embodiment of the invention as hereinbefore exemplified, without departing from its scope as defined in and by the appended claims. For example, the modulation 26 may be formed on either surface of the PAL substrate 24. The modulation may be of any suitable profile, provided it is capable of producing the desired effect, i.e., diffraction orders.

What is claimed is:

1. A multifocal lens having far and near vision zones, the multifocal lens comprising a combination of a progressive addition lens and a diffractive element wherein:

(a) said progressive addition lens is a substrate carrying said diffractive element, which is in the form of a modulation on the surface of the substrate:

said substrate has refractive power distribution defining far and near vision zones, selected in accordance with respective prescribed values of optical power required for a patient's eye at the patient's distance reading vision, and an intermediate transition region between the far and near vision zones; and (b) said modulation produces locally variable optical power addition to the optical power of the substrate, said locally variable optical power addition being maximal within said intermediate transition region and decreasing gradually towards the far and near vision zones of the substrate, said far and near vision zones of the multifocal lens being thereby wider than said far and near vision zones of the substrate.

2. The lens according to claim 1, wherein said modulation is of a kind producing diffraction orders.

3. The lens according to claim 2, wherein said modulation is a diffraction grating.

4. The lens according to claim 3, wherein said diffraction grating is a phase grating.

5. The lens according to claim 1, wherein diffraction haze within said intermediate transition region is smaller than that of a pure diffractive lens.

6. The lens according to claim 1, wherein said modulation is formed on the convex surface of the substrate.

7. The lens according to claim 1, wherein said progressive addition lens is of a soft design.

8. The lens according to claim 1, wherein the locally variable power addition is such that the multifocal lens has substantially reduced haze as compared to that of a pure diffractive lens.

9. The lends according to claim 1, wherein the optical power variation of the diffractive element is smaller than the power addition of the progressive addition lens.

10. The lens according to claim 1, wherein said refractive power distribution of the substrate is achieved by a specific surface profile of the substrate.

11. The lens according to claim 1, wherein surface of the substrate is spherical and is made of gradient index materials providing said refractive power distribution.

* * * * *